United States Patent
Yoon

(10) Patent No.: US 12,509,571 B2
(45) Date of Patent: Dec. 30, 2025

(54) RUBBER COMPOSITION FOR A MOTOR MOUNT WITH FATIGUE RESISTANCE AND A RUBBER FOR A MOTOR MOUNT INCLUDING THE SAME

(71) Applicants: HYUNDAI MOTOR COMPANY, Seoul (KR); KIA CORPORATION, Seoul (KR)

(72) Inventor: Min Jae Yoon, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 514 days.

(21) Appl. No.: 18/082,902

(22) Filed: Dec. 16, 2022

(65) Prior Publication Data
US 2023/0257557 A1    Aug. 17, 2023

(30) Foreign Application Priority Data
Feb. 15, 2022    (KR) .......................... 10-2022-0019544

(51) Int. Cl.
| | | |
|---|---|---|
| C08L 7/00 | (2006.01) | |
| C08K 3/04 | (2006.01) | |
| C08K 3/22 | (2006.01) | |
| C08K 3/36 | (2006.01) | |
| C08K 5/00 | (2006.01) | |
| C08K 5/17 | (2006.01) | |
| C08K 5/3412 | (2006.01) | |
| C08K 5/3415 | (2006.01) | |
| C08K 5/44 | (2006.01) | |

(52) U.S. Cl.
CPC ........ *C08L 7/00* (2013.01); *C08K 3/04* (2013.01); *C08K 3/22* (2013.01); *C08K 3/36* (2013.01); *C08K 5/17* (2013.01); *C08K 5/3412* (2013.01); *C08K 5/44* (2013.01); *C08K 2003/2296* (2013.01); *C08K 5/0025* (2013.01); *C08K 5/3415* (2013.01); *C08L 2203/20* (2013.01)

(58) Field of Classification Search
CPC ........ C08L 7/00; C08K 5/0025; C08K 5/3412; C08K 5/3415
See application file for complete search history.

(56) References Cited

U.S. PATENT DOCUMENTS

2012/0141712 A1*    6/2012 Otaka ................... B32B 25/14
428/500

FOREIGN PATENT DOCUMENTS

| KR | 20040000241 A | 1/2004 | |
|---|---|---|---|
| KR | 101745213 B1 | 6/2017 | |
| WO | WO-9116377 A1 * | 10/1991 | ........... C12N 11/082 |

OTHER PUBLICATIONS

Machine translation of KR-101745213-B1 obtained from IP.com (Year: 2017).*

* cited by examiner

*Primary Examiner* — Kregg T Brooks
*Assistant Examiner* — David R. Foss
(74) *Attorney, Agent, or Firm* — Lempia Summerfield Katz LLC

(57) ABSTRACT

Disclosed are a rubber composition for a motor mount that exhibits improved fatigue resistance and maintains desired mechanical properties using a second crosslinking agent having a first functional group and a second functional group different from each other, and a rubber for motor mounts including the same. The rubber composition includes a natural rubber, a filler, an activating agent, an antiaging agent, a dispersant, a first crosslinking agent containing sulfur, a vulcanization accelerator, and a second crosslinking agent having different first functional groups and second functional groups, wherein the first functional group is N-hydroxysuccinimide ester (NHS ester), and wherein the second functional group is maleimide.

18 Claims, No Drawings

RUBBER COMPOSITION FOR A MOTOR MOUNT WITH FATIGUE RESISTANCE AND A RUBBER FOR A MOTOR MOUNT INCLUDING THE SAME

CROSS-REFERENCE TO RELATED APPLICATION

This application claims under 35 U.S.C. § 119(a) the benefit of priority to Korean Patent Application No. 10-2022-0019544, filed on Feb. 15, 2022, the entire contents of which are incorporated herein by reference.

BACKGROUND

(a) Technical Field

The present disclosure relates to a rubber composition, and more particularly to a rubber composition for a motor mount that has improved fatigue resistance and maintains mechanical properties using a second crosslinking agent having a first functional group and a second functional group different from each other. The present disclosure further relates to a rubber for motor mounts including the rubber composition.

(b) Background Art

Recently, as interest in the environment has increased, sales of electric vehicles that use electricity as a power source are rapidly increasing and customer demand therefor is also increasing.

Therefore, there are great differences in the surrounding environment issues between conventional vehicles equipped with internal combustion engines using petroleum as a power source and electric vehicles equipped with a motor using electricity.

Therefore, in the prior art, engine mounts provided on internal combustion engines were developed using rubber materials for improving heat resistance so that the engine mounts can withstand high temperatures caused by the engines.

In addition, the thermal load of the motor is very small in electric vehicles, so the performance required for motor mounts is changing.

Additionally, a large number of batteries are mounted to increase the mileage of electric vehicles, so high durability is required in order to withstand the load due to the increased weight of the vehicles.

The above information disclosed in this Background section is only to enhance understanding of the background of the disclosure, and therefore it may include information that does not form the prior art that is already known to a person of ordinary skill in the art.

SUMMARY

The present disclosure provides a rubber composition for motor mounts having improved fatigue resistance while maintaining excellent mechanical properties, and a rubber composition for motor mounts including the same.

The objects of the present disclosure are not limited to that described above. Other objects of the present disclosure are understood from the following description and are able to be implemented by means defined in the claims and combinations thereof.

In one aspect, a rubber composition is provided. The rubber composition includes a natural rubber, a filler, an activating agent, an antiaging agent, a dispersant, a first crosslinking agent containing sulfur, a vulcanization accelerator, and a second crosslinking agent having a first functional group and a second functional group different from the first functional group. The first functional group may include N-hydroxysuccinimide ester (NHS ester), and the second functional group may include maleimide.

The rubber composition may include 100 parts by weight of the natural rubber, 15 parts by weight to 45 parts by weight of the filler, 9 parts by weight to 13 parts by weight of the activating agent, 5 parts by weight to 9 parts by weight of the antiaging agent, 2 parts by weight to 5 parts by weight of the dispersant, 1 part by weight to 2 parts by weight of the first crosslinking agent, 0.5 parts by weight to 1.5 parts by weight of the vulcanization accelerator, and 0.2 parts by weight to 1.5 parts by weight of the second crosslinking agent.

The filler may include 10 parts by weight to 30 parts by weight of the silica and 5 parts by weight to 15 parts by weight of the carbon black, based on 100 parts by weight of the natural rubber.

The carbon black may include a high abrasion furnace (HAF).

The activating agent may include 7 parts by weight to 13 parts by weight of the zinc oxide and 1 part by weight to 2 parts by weight of the stearic acid based on 100 parts by weight of the natural rubber.

The antiaging agent may include 1 part by weight to 3 parts by weight of 2,2,4-trimethyl-1,2-dihydroquinoline (TMQ), 1 part by weight to 2 parts by weight of N-(1,3-dimethylbutyl)-N'-phenyl-phenylene diamine, and 1 part by weight to 3 parts by weight of paraffin wax based on 100 parts by weight of the natural rubber.

The vulcanization accelerator may include 1 part by weight to 3 parts by weight of tetrabenzylthiuram disulfide (TBzTD) and 1 part by weight to 3 parts by weight of N-cyclohexylbenzothiazole-2-sulfenamide (CZ) based on 100 parts by weight of the natural rubber.

The second crosslinking agent may include N-γ-maleimidobutyryl-oxysuccinimide ester (GMBS).

In another aspect, a rubber for motor mounts is provided, wherein the rubber includes the rubber composition disclosed herein.

Other aspects and embodiments of the disclosure are discussed infra.

DETAILED DESCRIPTION

The objects described above, as well as other objects, features, and advantages, re understood from the following embodiments with reference to the attached drawings. However, the present disclosure is not limited to the embodiments disclosed herein and may be embodied in different forms. The embodiments are suggested only to offer a thorough and complete understanding of the disclosed context and to sufficiently inform those skilled in the art of the technical concept of the present disclosure.

The terms "comprise" or "has", when used in this specification, specify the presence of stated features, integers, steps, operations, elements, components, or combinations thereof, but do not preclude the presence or addition of one or more other features, integers, steps, operations, elements, components, or combinations thereof.

Unless the context clearly indicates otherwise, all numbers, figures, and/or expressions that represent ingredients, reaction conditions, polymer compositions and amounts of mixtures used in the specification are approximations that reflect various uncertainties of measurement occurring inherently in obtaining these figures, among other things. For this reason, it should be understood that, in all cases, the term "about" should be understood to modify all such numbers, figures, and/or expressions. In addition, when numerical ranges are disclosed in the description, these ranges are continuous, and include all numbers from the minimum to the maximum, including the maximum within each range, unless otherwise defined. Furthermore, when the range refers to an integer, it includes all integers from the minimum to the maximum, including the maximum within the range, unless otherwise defined.

It should be understood that, in the specification, when a range is referred to regarding a parameter, the parameter encompasses all figures including end points disclosed within the range. For example, the range of "5 to 10" includes figures of 5, 6, 7, 8, 9, and 10, as well as arbitrary sub-ranges, such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include numbers such as 10%, 11%, 12% and 13%, as well as 30%, and any sub-ranges, such as 10% to 15%, 12% to 18%, or 20% to 30%, as well as any numbers, such as 10.5%, 15.5% and 25.5%, between appropriate integers that fall within the range.

The rubber composition may include a natural rubber, a filler, zinc oxide, an activating agent, an antiaging agent, a dispersant, a first crosslinking agent including sulfur, a vulcanization accelerator, and a second crosslinking agent having different first functional groups and second functional groups, wherein the first functional group may include N-hydroxysuccinimide ester (NHS ester) and the second functional group may include maleimide.

Specifically, the rubber composition may include 100 parts by weight of the natural rubber, 15 parts by weight to 45 parts by weight of the filler, 9 parts by weight to 13 parts by weight of the activating agent, 5 parts by weight to 9 parts by weight of the antiaging agent, 2 parts by weight to 5 parts by weight of the dispersant, 1 part by weight to 2 parts by weight of the first crosslinking agent, 0.5 parts by weight to 1.5 parts by weight of the vulcanization accelerator, and 0.2 parts by weight to 1.5 parts by weight of the second crosslinking agent.

Each component constituting the rubber composition is described in more detail below.

(A) Natural Rubber

A conventional rubber composition is prepared by mixing natural rubber with butadiene rubber, which is a synthetic rubber. In particular, when butadiene rubber is mixed with natural rubber, hardness can be secured, but fatigue resistance is lowered.

Accordingly, natural rubber is used alone in the rubber composition disclosed herein, and is present in an amount of 100 parts by weight. The natural rubber may impart excellent miscibility and dispersibility and improve strength and fatigue resistance to the rubber composition.

(B) Filler

The filler may have filling and reinforcing functions in the rubber composition, and the filler may be present in an amount of 15 parts by weight to 45 parts by weight based on 100 parts by weight of natural rubber in the rubber composition.

The filler may include silica and carbon black.

Specifically, the silica may be present in an amount of 10 parts by weight to 30 parts by weight based on 100 parts by weight of natural rubber in the rubber composition. In this case, when the content of silica is less than 10 parts by weight, the effect of improving physical properties may be insufficient. Conversely, when the content of silica exceeds 30 parts by weight, problems associated with dispersion and distribution of silica may occur and a problem of poor processability may occur due to excessive hardness when producing vibration-resistant products.

The silica may improve the durability and mechanical properties of the rubber composition when used in combination with carbon black in the rubber composition than when carbon black is used alone therein.

Specifically, the silica may be Coupsil® 6411 from Evonik, which has excellent compressibility and restoring force.

In addition, the carbon black may be present in an amount of 5 parts by weight to 15 parts by weight based on 100 parts by weight of natural rubber in the rubber composition. In this case, when the content of carbon black is less than 5 parts by weight, the physical property specifications required for vibration-resistant rubber products are unsatisfactory. Conversely, when the content of carbon black exceeds 15 parts by weight, silica dispersion and distribution problems may occur, and consequently, the physical properties required for vibration-resistant rubber products are. Thus, problems of defects and low processability may occur in the process of manufacturing products.

Specifically, the carbon black may include a high abrasion furnace (HAF).

The high abrasion furnace has the advantages of good workability and dispersibility, minimal reduction in reinforcement properties even when contained in large amounts, desirable rebound elasticity and bending resistance of vulcanized rubber, and low heat generation.

(C) Activating Agent

The activating agent may increase the rate of the crosslinking reaction. The activating agent may include zinc oxide (ZnO), stearic acid (St-Acid), or a combination thereof. The activating agent is not particularly limited to these compounds and any known activating agent may be used.

The activating agent may be present in an amount of 9 parts by weight to 13 parts by weight based on 100 parts by weight of natural rubber in the rubber composition. In this case, when the content of the activating agent is less than 9 parts by weight, a problem of a slow crosslinking reaction may occur. Conversely, when the content of the activating agent is higher than 13 parts by weight, the crosslinking reaction may be excessively fast, which may cause problems during production.

Specifically, the activating agent may include 7 parts by weight to 13 parts by weight of the zinc oxide and 1 part by weight to 2 parts by weight of the stearic acid based on 100 parts by weight of the natural rubber.

(D) Antiaging Agent

The antiaging agent may be present in an amount of 5 parts by weight to 9 parts by weight based on 100 parts by weight of natural rubber in the rubber composition.

The antiaging agent may include 2,2,4-trimethyl-1,2-dihydroquinoline (TMQ), N-(1,3-dimethylbutyl)-N'-phenyl-phenylene, and paraffin wax.

Specifically, the antiaging agent may include 1 part by weight to 3 parts by weight of the 2,2,4-trimethyl-1,2-dihydroquinoline, 1 part by weight to 2 parts by weight of the N-(1,3-dimethylbutyl)-N' phenyl-phenylene diamine, and 1 part by weight to 3 parts by weight of the paraffin wax based on 100 parts by weight of the natural rubber.

The 2,2,4-trimethyl-1,2-dihydroquinoline has advantages of being highly effective in preventing aging due to heat, causing no blooming during blending, and having no influence on the vulcanization accelerator.

The N-(1,3-dimethylbutyl)-N'-phenyl-phenylene diamine may be effective in providing bending resistance, oxidation resistance, ozone cracking resistance, and freezing resistance. Although the N-(1,3-dimethylbutyl)-N'-phenyl-phenylene diamine is vulnerable to contamination, it has excellent decomposition and good processability, and thus excellent resistance to oxidation caused by ozone and excellent resistance to freezing damage and bending cracks.

As the paraffin wax, an anti-check wax capable of protecting rubber products against cracking caused by ozone and weathering may be used.

(E) Dispersant

The dispersant may be present in an amount of 2 parts by weight to 5 parts by weight based on 100 parts by weight of natural rubber in the rubber composition.

The dispersant may be a known one in the art of the present disclosure without any particular limitation.

Specifically, the dispersant may be Struktol WB 212 manufactured by Schill+Seilacher GmbH.

The dispersant may be a fatty acid having a grown structure, and may facilitate dispersion of carbon black, silica, and rubber.

(F) First Crosslinking Agent

The first crosslinking agent may include sulfur. The first crosslinking agent may be present in an amount of 1 part by weight to 2 parts by weight based on 100 parts by weight of natural rubber in the rubber composition. In this case, if the content of the first crosslinking agent is less than 1 part by weight, the durability of the rubber may be deteriorated, and a problem of adhesion failure may occur. Conversely, when the content of the first crosslinking agent is higher than 2 parts by weight, there may be a problem of deterioration in physical properties.

(G) Vulcanization Accelerator

The vulcanization accelerator may be blended with sulfur, which is the first crosslinking agent, to impart desired physical properties to the rubber composition.

The vulcanization accelerator may be present in an amount of 0.5 parts by weight to 1.5 parts by weight based on 100 parts by weight of natural rubber in the rubber composition.

As the vulcanization accelerator, a known one in the art of the present disclosure may be used without particular limitation.

As the vulcanization accelerator, a monosulfide-based accelerator or a disulfide-based accelerator containing a small amount of sulfur may be used for heat resistance.

The vulcanization accelerator may include tetrabenzylthiuram disulfide (TBzTD), N-cyclohexylbenzothiazole-2-sulfenamide (CZ), or a combination thereof.

Specifically, the vulcanization accelerator may include 1 part by weight to 3 parts by weight of the tetrabenzylthiuram disulfide and 1 part by weight to 3 parts by weight of the N-cyclohexylbenzothiazole-2-sulfenamide based on 100 parts by weight of the natural rubber.

(H) Second Crosslinking Agent

The second crosslinking agent may increase crosslinking density and crosslinking flexibility in the rubber composition to thereby improve the fatigue resistance of rubber.

The second crosslinking agent may be present in an amount of 0.2 parts by weight to 1.5 parts by weight based on 100 parts by weight of natural rubber in the rubber composition. Here, when the content of the second crosslinking agent is less than 0.2 parts by weight, it is difficult to secure desired durability. Conversely, when the content of the second crosslinking agent is higher than 1.5 parts by weight, there are problems in that the material properties are deteriorated, and the possibility of fatigue failure increases due to the lack of flexibility of the material.

The second crosslinking agent may include a first functional group at one end and a second functional group at the other end. The first functional group and the second functional group may be different from each other, the first functional group may be an N-hydroxysuccinimide ester, and the second functional group may be maleimide.

Specifically, the second crosslinking agent may be N N-γ-maleimidobutyryl-oxysuccinimide ester (GMBS).

The second crosslinking agent may include a compound represented by Formula 1 below.

[Formula 1]

In another aspect, the present disclosure relates to a rubber for a motor mount including the rubber composition.

The rubber for the motor mount may be used in other fields without limitation but is applicable to automobile parts because it overcomes the problems in which rubber cannot withstand high loads imposed by large vehicles and battery electric vehicles, and parts are damaged due to the lack of fatigue resistance due to continuous loading.

Hereinafter, the present disclosure is described in more detail with reference to specific examples. However, the following examples are provided only for better understanding of the present disclosure, and thus should not be construed as limiting the scope of the present disclosure.

Examples 1 to 4 and Comparative Examples 1 to 5

Rubber compositions were prepared in accordance with a conventional method using the components and contents shown in Table 1 below.

TABLE 1

| Item | | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 |
|---|---|---|---|---|---|---|---|---|---|---|
| (A) Raw material rubber | Natural rubber | 100 | 100 | 100 | 100 | 100 | 100 | 100 | 100 | 100 |
| (C) Activating agent | Zinc oxide | 10 | 10 | 10 | 10 | 10 | 10 | 10 | 10 | 10 |
| | Stearic acid | 1 | 1 | 1 | 1 | 1 | 1 | 1 | 1 | 1 |

TABLE 1-continued

| | Item | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 |
|---|---|---|---|---|---|---|---|---|---|---|
| (D) Antiaging agent | RD | 2.0 | 2.0 | 2.0 | 2.0 | 2.0 | 2.0 | 2.0 | 2.0 | 2.0 |
| | Kumanox 13 | 1.5 | 1.5 | 1.5 | 1.5 | 1.5 | 1.5 | 1.5 | 1.5 | 1.5 |
| | SUNPRAX 682 | 2 | 2 | 2 | 2 | 2 | 2 | 2 | 2 | 2 |
| (E) Dispersant | WB 212 | 2 | 2 | 2 | 2 | 2 | 2 | 2 | 2 | 2 |
| (B) Filler | Carbon Black | 15 | 15 | 15 | 15 | 35 | 22 | 35 | 15 | 15 |
| | Silica | 10 | 10 | 10 | 10 | — | 10 | — | 10 | 20 |
| (F) First crosslinking agent | S | 1.0 | 1.0 | 1.0 | 1.0 | 0.6 | 0.6 | 1.0 | 1.0 | 1.0 |
| (G) Vulcanization accelerator | TBzTD-70 | 0.8 | 0.8 | 0.8 | 0.8 | 2 | 2 | 0.8 | 0.8 | 0.8 |
| | CZ | 0.3 | 0.3 | 0.3 | 0.3 | 1 | 1 | 0.3 | 0.3 | 0.3 |
| (H) Second crosslinking agent | GMBS | 0.2 | 0.5 | 1.0 | 1.5 | — | — | — | 2.0 | — |

[Ingredients for raw materials]
(A) Raw material rubber: Natural rubber (NR)
(B) Filler: Carbon black: N330 (HAF, High Abrasion Furnace) from Orion Engineered Carbons Co., Ltd.; and Silica: Coupsil® 6411 from EVONIK
(C) Activating agent: Zinc oxide (ZnO); and Stearic acid (St-Acid)
(D) Antiaging agent: Kumanox RD (Polymer of 2,2,4-trimethl-1,2-dihydroquinoline) from Kumho Monsanto, Inc.; Kumanox 13 (N-(1,3-Dimethylbutyl)-N'-phenyl-phenylene diamine) from Kumho Monsanto, Inc.; and ANTILUX654, paraffin wax from Rhein Chemie Additives
(E) Dispersant: Struktol® WB 212 from Schill + Seilacher GmbH
(F) First crosslinking agent: MIDAS 101, sulfur, from Miwon Commercial Co., Ltd.
(G) Vulcanization accelerator: TBzTD-70 (Tetrabenzyl thiuram disulfide) from Rhein Chemie Additives; and ORICEL CZ (N-Cyclohexyl benzothiazole-2-Sulfenamide) from Dongyang Chemical Co., Ltd.
(H) Second crosslinking agent: GMBS (N-γ-maleimidobutyryl-oxysuccinimide ester) from SigmaAldrich Experimental Example First, rubber for a motor mount was prepared in accordance with a conventional method using the rubber compositions prepared in Examples 1 to 4 and Comparative Examples 1 to 5. Then, the physical properties were measured in accordance with the evaluation method for each item below. The results are shown in Table 2 below.

Evaluation Method

Tensile strength and elongation: ISO 37 type 1A: Tensile strength and elongation were measured with a No. 3 dumbbell at a rate of 500 mm/min and the specimens were evaluated in accordance with the standard method as a method of measuring the physical properties of rubber.

Heat resistance (tensile strength change, elongation change): ISO 9272, 23529, 1134: Heat resistance was measured using a No. 3 dumbbell, and the change in properties of the rubber was evaluated in accordance with a standard method as a method of measuring changes in physical properties after aging compared to initial rubber properties (tensile strength, elongation).

Fatigue resistance was measured in accordance with evaluation method of MS200-61.

TABLE 2

| | Item | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 |
|---|---|---|---|---|---|---|---|---|---|---|
| Specimens | Tensile strength (kg f/cm$^2$) | 218 | 238 | 245 | 248 | 208 | 215 | 220 | 180 | 232 |
| | Elongation (%) | 596 | 600 | 589 | 580 | 610 | 615 | 605 | 565 | 600 |
| Heat resistance | Tensile strength change (%) | −53 | −51 | −48 | −47 | −28 | −26 | −56 | −54 | −55 |
| | Elongation change (%) | −50 | −48 | −52 | −49 | −34 | −31 | −48 | −53 | −45 |
| | Fatigue resistance (times) | 128 × 10$^4$ | 168 × 10$^4$ | 157 × 10$^4$ | 148 × 10$^4$ | 82 × 10$^4$ | 79 × 10$^4$ | 110 × 10$^4$ | 115 × 10$^4$ | 115 × 10$^4$ |

As can be seen from the results of Table 2, Examples 1 to 4 and Comparative Examples 1 to 5 exhibited almost identical results for mechanical properties such as tensile strength, elongation, and heat resistance.

Meanwhile, in Examples 1 to 4, in which the second crosslinking agent was added, the components were mixed in optimal amounts and the number of cycles in the fatigue resistance test was 120 or more, so the mechanical properties were excellent and fatigue resistance was excellent.

Meanwhile, Comparative Examples 1 to 3 and 5, in which the second crosslinking agent was not added, exhibited less than 120 cycles in the fatigue endurance test, so the fatigue resistance was relatively poor compared to the examples.

Therefore, in the present disclosure, the durability of Examples 1 to 4, to which the second crosslinking agent is added, was secured, and the fatigue resistance was improved by 50 to 120% compared to the Comparative Examples.

In addition, it was found that Comparative Example 4, to which the second crosslinking agent was added in excess (1.5 parts by weight or more), had relatively poor physical properties and durability compared to Examples due to the low flexibility of the material.

In addition, as in the Comparative Example, it can be seen that, when the content of the secondary crosslinking agent is less than 0.2 parts by weight or when the secondary crosslinking agent is not used, it is difficult to secure excellent durability due to the insufficient improvement in bonding strength.

Meanwhile, Comparative Examples 1 and 2 exhibited improved heat resistance, which is desirable for application to conventional engine mounts, and were superior in tensile strength and elongation change compared to Examples, but the number of cycles measured in the fatigue endurance test was 75 to 85, which indicates very low fatigue resistance compared to Examples.

Therefore, the rubber composition is prepared by mixing a natural rubber, a filler, an activating agent, an anti-aging agent, a dispersant, a first crosslinking agent containing sulfur, a vulcanization accelerator, and a second crosslinking agent in appropriate amounts, so excellent mechanical properties of the specimen can be maintained, and fatigue resistance can be maximized.

The rubber for the motor mount may be used in other fields without limitation but is applicable to automobile parts because it overcomes the problems in which rubber cannot withstand high loads imposed by large vehicles and battery electric vehicles, and parts are damaged due to the lack of fatigue resistance due to repeated loads.

As is apparent from the foregoing, the rubber composition as disclosed herein is prepared by mixing a natural rubber, a filler, an activating agent, an anti-aging agent, a dispersant, a first crosslinking agent containing sulfur, a vulcanization accelerator, and a second crosslinking agent in appropriate amounts, so excellent mechanical properties of the specimen can be maintained and fatigue resistance can be maximized.

The rubber for motor mounts may be used in other fields without limitation but is particularly suited for application to automobile parts because it overcomes problems in which rubber cannot withstand high loads imposed by large vehicles and battery electric vehicles and in which parts are damaged due to the lack of fatigue resistance due to repeated loading.

The effects of the present disclosure are not limited to those mentioned above. It should be understood that the effects of the present disclosure include all effects that can be inferred from the description of the present disclosure.

The present disclosure has been described in detail with reference to embodiments thereof. However, it will be appreciated by those skilled in the art that changes may be made in these embodiments without departing from the principles and spirit of the present disclosure, the scope of which is defined in the appended claims and their equivalents.

What is claimed is:

1. A rubber composition comprising:
   a natural rubber;
   a filler;
   an activating agent;
   an antiaging agent;
   a dispersant;
   a first crosslinking agent comprising sulfur;
   a vulcanization accelerator; and
   a second crosslinking agent comprising a first functional group and a second functional group different from the first function group,
   wherein the first functional group comprises N-hydroxysuccinimide ester (NHS ester), and
   wherein the second functional group comprises maleimide.

2. The rubber composition of claim 1, wherein the rubber composition comprises:
   100 parts by weight of the natural rubber;
   15 parts by weight to 45 parts by weight of the filler;
   9 parts by weight to 13 parts by weight of the activating agent;
   5 parts by weight to 9 parts by weight of the antiaging agent;
   2 parts by weight to 5 parts by weight of the dispersant;
   1 part by weight to 2 parts by weight of the first crosslinking agent;
   0.5 parts by weight to 1.5 parts by weight of the vulcanization accelerator; and
   0.2 parts by weight to 1.5 parts by weight of the second crosslinking agent.

3. The rubber composition of claim 2, wherein the filler comprises:
   10 parts by weight to 30 parts by weight of silica; and
   5 parts by weight to 15 parts by weight of carbon black, based on 100 parts by weight of the natural rubber.

4. The rubber composition of claim 3, wherein the carbon black comprises a high abrasion furnace (HAF).

5. The rubber composition of claim 3, wherein the activating agent comprises:
   7 parts by weight to 13 parts by weight of zinc oxide; and
   1 part by weight to 2 parts by weight of stearic acid, based on 100 parts by weight of the natural rubber.

6. The rubber composition of claim 5, wherein the antiaging agent comprises:
   1 part by weight to 3 parts by weight of 2,2,4-trimethyl-1,2-dihydroquinoline (TMQ);
   1 part by weight to 2 parts by weight of N-(1,3-dimethylbutyl)-N'-phenyl-phenylene diamine; and
   1 part by weight to 3 parts by weight of paraffin wax, based on 100 parts by weight of the natural rubber.

7. The rubber composition of claim 6, wherein the vulcanization accelerator comprises:
   1 part by weight to 3 parts by weight of tetrabenzylthiuram disulfide (TBzTD); and
   1 part by weight to 3 parts by weight of N-cyclohexylbenzothiazole-2-sulfenamide (CZ), based on 100 parts by weight of the natural rubber.

8. The rubber composition of claim 2, wherein the second crosslinking agent comprises N-γ-maleimidobutyryl-oxysuccinimide ester (GMBS).

9. The rubber composition of claim 2, wherein the activating agent comprises:
   7 parts by weight to 13 parts by weight of zinc oxide; and
   1 part by weight to 2 parts by weight of stearic acid, based on 100 parts by weight of the natural rubber.

10. The rubber composition of claim 2, wherein the antiaging agent comprises:
    1 part by weight to 3 parts by weight of 2,2,4-trimethyl-1,2-dihydroquinoline (TMQ);
    1 part by weight to 2 parts by weight of N-(1,3-dimethylbutyl)-N'-phenyl-phenylene diamine; and
    1 part by weight to 3 parts by weight of paraffin wax, based on 100 parts by weight of the natural rubber.

11. The rubber composition of claim 2, wherein the vulcanization accelerator comprises:

1 part by weight to 3 parts by weight of tetrabenzylthiuram disulfide (TBzTD); and 1 part by weight to 3 parts by weight of N-cyclohexyl-benzothiazole-2-sulfenamide (CZ), based on 100 parts by weight of the natural rubber.

12. The rubber composition of claim 1, wherein the filler comprises:

10 parts by weight to 30 parts by weight of silica; and 5 parts by weight to 15 parts by weight of carbon black, based on 100 parts by weight of the natural rubber.

13. The rubber composition of claim 12, wherein the carbon black comprises a high abrasion furnace (HAF).

14. The rubber composition of claim 1, wherein the activating agent comprises:

7 parts by weight to 13 parts by weight of zinc oxide; and 1 part by weight to 2 parts by weight of stearic acid, based on 100 parts by weight of the natural rubber.

15. The rubber composition of claim 1, wherein the antiaging agent comprises:

1 part by weight to 3 parts by weight of 2,2,4-trimethyl-1,2-dihydroquinoline (TMQ);

1 part by weight to 2 parts by weight of N-(1,3-dimethylbutyl)-N'-phenyl-phenylene diamine; and 1 part by weight to 3 parts by weight of paraffin wax, based on 100 parts by weight of the natural rubber.

16. The rubber composition of claim 1, wherein the vulcanization accelerator comprises:

1 part by weight to 3 parts by weight of tetrabenzylthiuram disulfide (TBzTD); and 1 part by weight to 3 parts by weight of N-cyclohexyl-benzothiazole-2-sulfenamide (CZ), based on 100 parts by weight of the natural rubber.

17. The rubber composition of claim 1, wherein the second crosslinking agent comprises N-γ-maleimidobutyryl-oxysuccinimide ester (GMBS).

18. A rubber for motor mounts comprising:

a rubber composition having:

a natural rubber;

a filler;

an activating agent;

an antiaging agent;

a dispersant;

a first crosslinking agent comprising sulfur;

a vulcanization accelerator; and a second crosslinking agent comprising a first functional group and a second functional group different from the first function group, wherein the first functional group comprises N-hydroxysuccinimide ester (NHS ester), and wherein the second functional group comprises maleimide.

* * * * *